(12) United States Patent
Desard et al.

(10) Patent No.: US 7,015,394 B2
(45) Date of Patent: Mar. 21, 2006

(54) SEALED AND ADAPTABLE CABLE BUSHING WITH EASY CABLE POSITIONING AND SLEEVE EQUIPPED WITH SUCH A BUSHING

(75) Inventors: Christophe Desard, Herbignac (FR); Herve Brunet, Nazaire (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/634,300

(22) Filed: Aug. 5, 2003

(65) Prior Publication Data

US 2004/0100028 A1 May 27, 2004

Related U.S. Application Data

(63) Continuation of application No. PCT/IB02/00328, filed on Feb. 4, 2002.

(30) Foreign Application Priority Data

Feb. 6, 2001 (FR) .................................. 01 01544

(51) Int. Cl.
*H02G 3/00* (2006.01)
(52) U.S. Cl. .................. 174/100; 174/65 SS; 174/151; 174/152 G; 174/153 G; 174/65 G; 277/314; 277/606
(58) Field of Classification Search ............ 174/65 SS, 174/100, 11 BH, 151, 152 G, 153 G, 65; 277/314, 606
See application file for complete search history.

(56) References Cited

U.S. PATENT DOCUMENTS 3,798,583 A * 3/1974 Charbonneau et al. ...... 337/202

| | | | |
|---|---|---|---|
| 4,056,252 A | * | 11/1977 | Simon .......................... 248/56 |
| 5,561,272 A | * | 10/1996 | Kunze et al. ................ 174/151 |
| 5,568,584 A | | 10/1996 | Smith |
| 5,775,702 A | | 7/1998 | Laeremans |

FOREIGN PATENT DOCUMENTS

| EP | 0 538 008 A2 | 4/1993 |
|---|---|---|
| FR | 2 748 867 | 11/1997 |
| WO | WO 90/05401 | 5/1990 |
| WO | WO 00/46895 | 8/2000 |

* cited by examiner

*Primary Examiner*—Dean A. Reichard
*Assistant Examiner*—Anton B. Harris
(74) *Attorney, Agent, or Firm*—John A. Burtis; James J. Trussell (57) ABSTRACT

A cable bushing intended to close off, in a sealed way, a space around a plurality of cables, comprises a first compression part (4) intended to be positioned towards the outside of a sleeve (47), a second compression part (6), offset in a longitudinal direction from the first compression part (4) and intended to be positioned toward the inside of the sleeve (47), a plurality of openings (8, 9, 11, 12) formed in the first compression part (4) and a plurality of corresponding openings (13, 14, 16, 17) formed in the second compression part (6), each of the said openings (8, 9, 11, 12) in the first compression part (4) being intended, together with the corresponding openings (13, 14, 16, 17) in the second compression part (6) for a respective cable to pass through, sealing means (7) located between the said first compression part (4) and the said second compression part (6), and compression means for moving the first compression part (4) and second compression part (6) towards one another in the longitudinal direction to compress the sealing means (7). The said first compression part (4) and the said second compression part (6) each comprise, for each opening (8, 9, 11, 12, 13, 14, 16, 17) therein, at least one piece (19, 21, 22, 23, 24, 26, 27, 28) that is movable to provide access individually to the respective opening (8, 9, 11, 12, 13, 14, 16, 17).

22 Claims, 5 Drawing Sheets

SEALED AND ADAPTABLE CABLE BUSHING WITH EASY CABLE POSITIONING AND SLEEVE EQUIPPED WITH SUCH A BUSHING

This Application claims priority from and is a continuation of PCT/IB02/00328 filed Feb. 4, 2002 which claims priority from French Application No. 01/01544 filed Feb. 6, 2001.

The present invention relates to a cable bushing intended to close off, in a sealed way, a space around a cable or plurality of cables and to a method of forming cable bushing. The present invention also relates to a protective sleeve equipped with one or more cable bushings.

BACKGROUND OF THE INVENTION

Sleeves protecting splices are customarily made of polymer material and provide a protection of splices between two or more cables against mechanical impact or corrosion. These have been known to comprise two bushings in the form of discs arranged respectively around the incoming cable or cables and around the outgoing cable or cables. These discs are positioned at each of the two ends of a sleeve. They make it possible to enclose, in a sealed way, the space between the two end discs. The sleeve with its two bushings may consist either of two shells joined together along their two longitudinal edges or of a longitudinally split tube hinged along one of the two longitudinal edges.

To make it possible for such bushings to be formed as a piece with cable bushing openings through which the cables are passed, the bushings customarily used are designed as several elements, so as to allow them to be positioned and fixed on either side of the cable or cables. Some known bushings are disclosed, for example, in EP-0,442,941; FR-2, 748,867; and U.S. Pat. No. 5,775,702.

SUMMARY OF THE INVENTION

There are some shortcomings with certain known sleeve and bushings. A first problem is that of designing a cable bushing which can be readily adapted according to the number of cables that the operator wishes to insert. A second problem posed is that of devising a cable bushing which is easy for an operator fitting one or more cables to use. A third problem posed is that of providing a configuration with sealing means for a cable bushing so that the sealing means used are effective. A fourth problem posed is that of having a cable bushing that can be assembled outside the protective sleeve.

According to the present invention, a cable bushing intended to close off, in a sealed way, a space around a plurality of cables, comprising: a first compression part intended to be positioned towards the outside of a sleeve; a second compression part, offset in a longitudinal direction from the first compression part and intended to be positioned toward the inside of the sleeve; a plurality of openings formed in the first compression part and a plurality of corresponding openings formed in the second compression part, each of the openings in the first compression part being intended, together with the corresponding openings in the second compression part for a respective cable to pass through, sealing means located between the first compression part and the second compression part; and compression means for moving the first compression part and second compression part towards one another in the longitudinal direction to compress the sealing means; wherein the first compression part and the second compression part each comprise, for each opening therein, at least one piece that is movable to provide access individually to the respective opening.

By virtue of the present invention, the operator will be able, as desired, to remove and refit movable pieces in order to adapt his cable bushing. Highly advantageously, each movable piece of the first compression part may be located longitudinally facing a respective movable piece of the second compression part.

The sealing means may comprise preferably, between the movable piece of the first compression part and the movable piece of the second compression part, movable portions. For this cable bushing, the first compression part and the second compression part may have a circular shape when viewed in the longitudinal direction or in cross section. In this case, each movable piece may be shaped in the form of a sector of a circle with a truncated point. In a variant, the first and second compression parts may have a rectangular shape when viewed in the longitudinal direction or in cross section. For these removable pieces to be easy to fit and to remove for having an access to the openings for the cables, each movable piece may be secured in the respective first and second compression part by clip-fastening means in the form of lugs and concavities. For these removable pieces to be easy to fit and to move for having an access to the openings for the cables, each movable piece may be pivotally mounted in the respective compression part.

To facilitate the fixing and the tailoring of the opening to any type of cable, the openings may be preferably circular. They may comprise inwardly-directed leaves for gripping cables that pass through the openings. Advantageously, the cable bushing may further comprise at least one longitudinal rod connecting the first compression part to the second compression part. The or each longitudinal rod may preferably have an angular cross section and is inserted in corresponding angular orifices formed in the first and second compression parts.

The sealing means may be advantageously compressed by movement of the first compression part in the said longitudinal direction towards the second compression part.

The second compression part may be favorably returned towards the first compression part by resilient means located on the inner end of the or each longitudinal rod or rods.

To obtain optimum sealing, the sealing means may comprise a gel. As an embodiment, each compression part may comprise four openings and four movable pieces.

According to a second aspect of the present invention, a protective sleeve for a cable splice comprises an aforementioned cable bushing, placed at least at one of its ends. The sleeve may comprise cable bushings at both ends of the sleeve, and a linkage passing both through the first and second compression parts of each cable bushing and serving to maintain the distance between the cable bushings.

According to a third aspect of the present invention, a method of forming a cable bushing for use in a protective sleeve, to provide a plurality of cable openings through which cables can pass into the sleeve, which bushing comprises first and second compression parts spaced apart from one another by sealing means whereby movement of the compression parts towards one another compresses the sealing means. The method comprises the steps of: (i) providing a central bushing piece and a plurality of movable bushing pieces, each of which bushing pieces comprises a respective portion of the first and second compression parts and of the sealing means; and (ii) locating the movable bushing pieces on the central bushing piece to form the cable bushing, wherein each movable bushing piece is co-operable with the central bushing piece to form a respective one of the said cable openings and is movable away therefrom to provide access to that cable opening individually.

The method may further include the steps of: (iii) positioning at least one cable so that it is located in a respective one of the said cable openings when the respective movable bushing piece is located on the central bushing piece; and (iv) moving the first and second compression parts towards one another to compress the sealing means.

The method may further include the steps of: (v) subsequently moving the first and second compression parts away from one another; and then (vi) moving one of the movable bushing pieces away from the central bushing piece to provide individual access to a cable in the respective cable opening.

The method may include the step of: (vii) subsequently re-locating the said one movable bushing piece on the central bushing piece, and moving the first and second compression parts towards one another to re-compress the sealing means.

BRIEF DESCRIPTION OF THE DRAWINGS

The invention will be clearly understood and its various advantages and various characteristics will become more apparent from the following description of the non-limiting embodiments given with reference to the appended diagrammatic drawings in which.

DETAILED DESCRIPTION OF THE PREFERRED EMBODIMENTS

A preferred embodiment of a cable bushing 1 of the present invention is illustrated in FIGS. 1–5. A cable bushing 1 of FIGS. 1 to 5 is intended to close off one end of a protective sleeve (see FIG. 6) and is in the form of a cylinder with two roughly round faces 2 and 3. The first of the round faces 2 is oriented in the direction of the first side, or outside of the sleeve. The other of the round faces 3 is oriented in the direction of the second side, or inside of the sleeve. The round outer face 2 is formed by a first compression part 4 with the configuration of a disc hereinafter known also as the outer compression part. The round inner face 3 is formed by a second compression part 6 with the configuration of a disc and is hereinafter known also as the inner compression part. Inserted between the two compression parts 4 and 6 is a sealing means, which is chosen in a preferred embodiment to be in the form of a gel sealant 7.

In the illustrated embodiment, a first series of four openings 8, 9, 11 and 12 is formed through the outer compression part 4. A second series of four openings 13, 14, 16 and 17 is formed through the inner compression part 6. The openings 8, 9, 11 and 12 may be uniformly arranged with respect to the central axis of revolution of the outer compression part 4. Further, the openings 13, 14, 16 and 17 may be uniformly arranged with respect to the central axis of revolution of the inner compression part 6. Given the symmetry of the cable bushing 1, and in order to insert the cable or cables, each of the openings 8, 9, 11 and 12 of the outer compression part 4 respectively face each of the openings 13, 14, 16 and 17 of the inner compression part 6.

Openings 8, 9, 11, 12, 13, 14, 16 and 17 are intended for the insertion of one or more cables through the cable bushing 1. Each opening 8, 9, 11, 12, 13, 14, 16 and 17 preferably comprises leaves 18. Leaves 18 make an angle with respect to the round outer face 2 and with respect to the round inner face 3. To do this, they each start from the edge of the corresponding opening and extend inwards and away from the face 2, 3 of the respective compression part. In this embodiment, leaves 18 extend towards the compression part 4 and 6 opposite.

In another preferred embodiment of the present invention (see more particularly FIGS. 7 to 9 described below), the leaves 18 around the openings 8, 9, 11 and 12 of the outer compression part 4 extend towards the outside of the cable bushing 1, i.e. outside the sleeve itself. Leaves 18 preferably are uniformly arranged around the corresponding openings. Given that leaves 18 extend towards the center of the corresponding opening, they have a free end of narrower width.

By way of example, use will be made of eight leaves 18 per opening. The shape of leaves 18 and their orientation gives a shape similar to that of a nozzle. Leaves 18 serve to grip the cables inserted through the cable bushing 1.

To make it easier for a cable to be inserted through the openings, the outer compression part 4 comprises removable portions. In the preferred embodiment illustrated in FIGS. 1–5, there are shown four such removable pieces 19, 21, 22 and 23. The inner compression part 6 also comprises four removable pieces 24, 26, 27 and 28. In the embodiment of FIGS. 1 to 6, the pieces 19, 21, 22, 23, 24, 26, 27 and 28 are all removable. The presence of these removable pieces 19, 21, 22 and 23 belonging to the outer compression part 4 will mean that this same outer compression part 4 will comprise a central non-removable outer piece 29. The presence of removable pieces 24, 26, 27 and 28 belonging to the inner compression part 6 will mean that this same inner compression part 6 will also comprise a non-removable central piece 31.

The two non-removable pieces 29 and 31 are mounted on a connecting rod 32 forming a longitudinal spindle positioned at the axis of revolution of the cable bushing 1. The removable pieces 19, 21, 22, 23, 24, 26, 27 and 28 are arranged in pairs longitudinally facing each other on, respectively, the outer compression part 4 and the inner compression part 6.

In the preferred embodiment as illustrated, removable pieces 19, 21, 22, 23, 24, 26, 27 and 28 have the shape of an angular sector the point of which has been truncated. Furthermore, removable pieces 19, 21, 22, 23, 24, 26, 27 and 28 define a portion of a respective one of the openings 8, 9, 11, 12, 13, 14, 16 and 17 of the two compression parts 4 and 6. For reasons of symmetry, in a preferred embodiment, the removable pieces 19, 21, 22, 23, 24, 26, 27 and 28 define half 30 openings. In consequence, removable pieces 19, 21, 22, 23, 24, 26, 27 and 28 each comprise leaves 18 attached to the edges of the corresponding half-openings. Thus, each removable piece comprises four leaves 18.

Removable pieces 19, 21, 22, 23, 24, 26, 27 and 28 can be extracted and refitted by the operator. They are readily accessible because they are located at the periphery of the outer compression part 4 and of the inner compression part 6. As a result, the central piece 29 of the outer compression part comprises four half-openings, each of which has four leaves 18 attached to its edge. Central piece 29 in this preferred embodiment has the shape of a cross. The central piece 31 of the inner compression part 6 also comprises four half-openings, each of which has four leaves 18 attached to its edge. This non-removable central piece 31 will also have the shape of a cross.

A respective portion of gel 33, 34, 36 and 37 forming part of the sealing means 7 is located between each pair of removable pieces located respectively longitudinally facing each other. Another portion of gel 38, forming the remainder of the sealing means 7 is located between the two non-removable central pieces 29 and 31 mounted on the rod 32. Towards the center of each of the openings 8, 9, 11, 12, 13, 14, 16 and 17, the portions of gel have a frustoconical shape around the leaves 18.

Given that each of the removable pieces 19, 21, 22, 23, 24, 26, 27 and 28 can be readily removed and refitted by the operator (as described below), but must nonetheless be quite firmly anchored into their respective non-removable central pieces 29, 31, they each comprise suitable fastening means. In the preferred illustrated embodiment, the bushing comprises clip-fastening means for fastening the removable pieces to the central piece. In the preferred embodiment, these clip-fastening means are in the form of a lug 20, 39 deploying from each removable piece 19, 21, 22, 23, 24, 26, 27 and 28 and extending into a concavity 41 formed in respective non-removable central piece 29, 31.

Other fastening or anchoring means (not depicted), such as screws or any other suitable mechanism, could be used for maintaining the removable pieces 19, 21, 22, 23, 24, 26, 27 and 28 in position on their respective non-removable central pieces 29, 31.

The connecting rod 32 has a hexagonal cross section, and the non-removable central pieces 29, 31 comprise a corresponding hexagonal orifice 42 intended for the passage of rod 32. As a result, the outer compression part 4 and the inner compression part 6 will be able to slide longitudinally along the rod 32 but, because of the hexagonal angular shape of the rod 32 and the orifice 41, will not be able to turn one with respect to the other.

Figure 1:
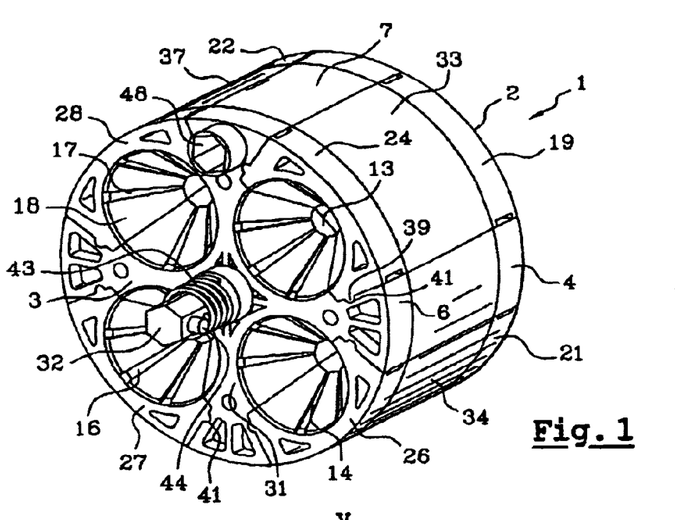
FIG. 1 depicts a rear perspective view of a preferred embodiment of a cable bushing according to the present invention.
Figure 2:
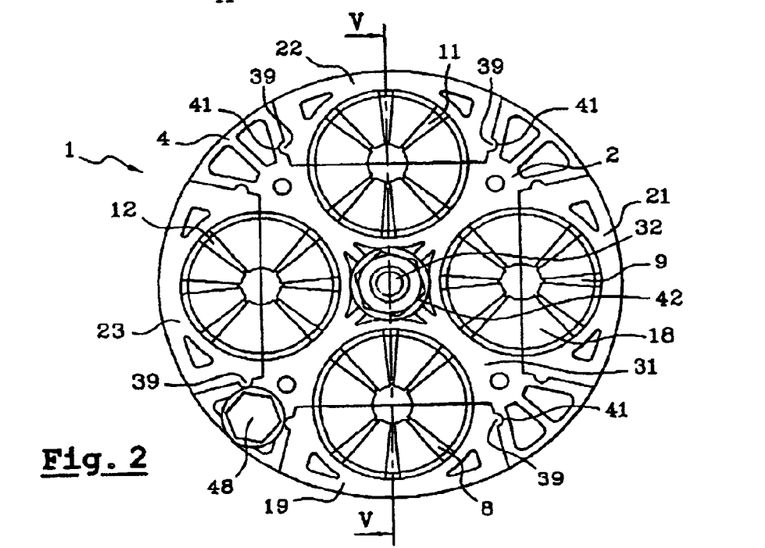
FIG. 2 depicts a front view of the cable bushing of FIG. 1.
Figure 3:
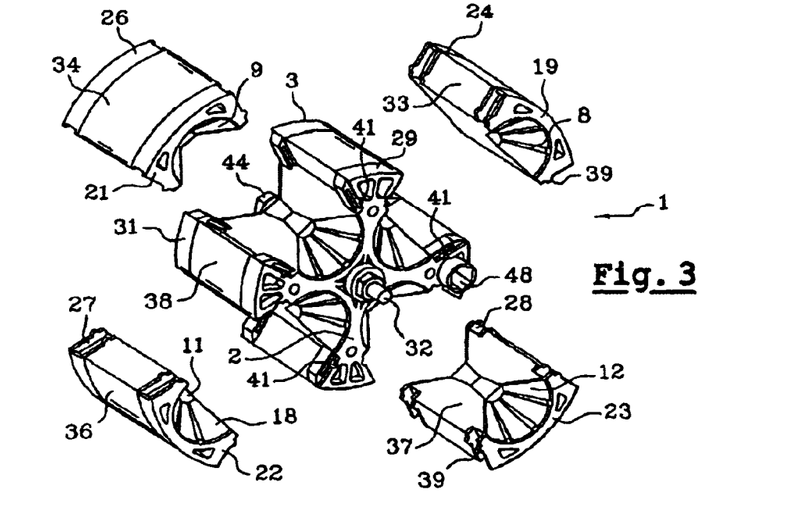
FIG. 3 depicts an exploded front perspective view of the cable bushing of FIG. 1.
Figure 4:
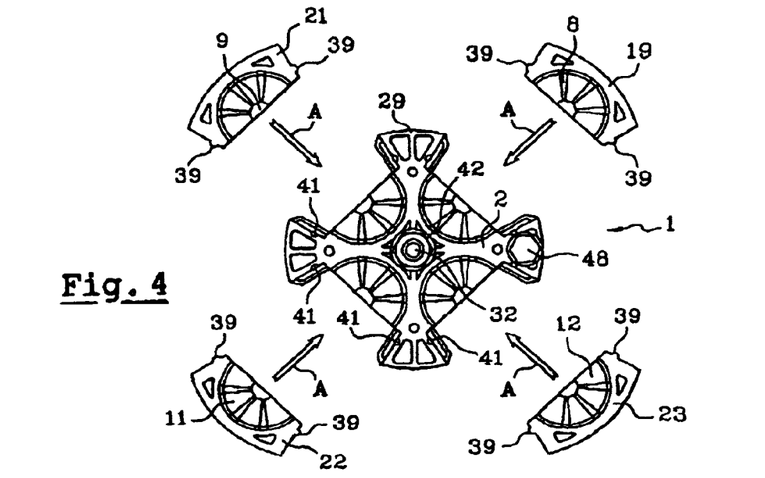
FIG. 4 depicts an exploded front view of the cable bushing of FIG. 1.
Figure 5:
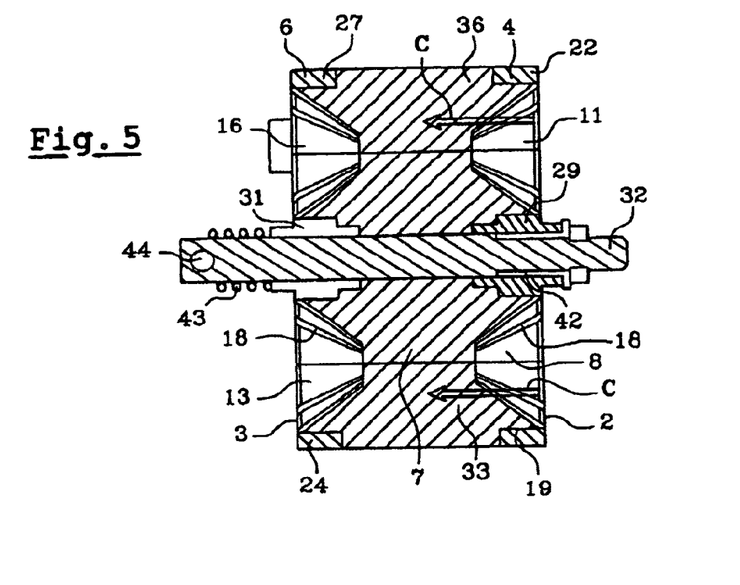
FIG. 5 depicts a view in longitudinal section along the plane V—V of the cable bushing of FIG. 2.
Figure 6:
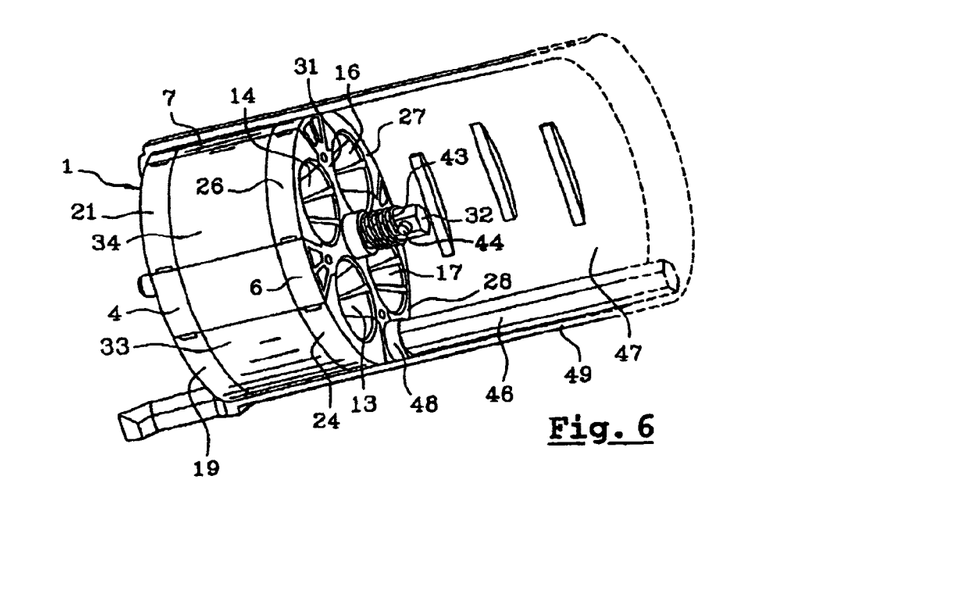
FIG. 6 depicts a partial cutaway of a portion of a preferred embodiment of a sleeve equipped with a cable bushing according to the present invention.

A relative longitudinal sliding movement of the outer compression part 4 in the direction of the inner compression part 6 will compress the portions of gel 33, 34, 36, 37 and 38 forming the sealing means 7.

A spring 43, held by a peg 44 passing at right angles through the rod 32, is inserted at the inner end of the rear of the rod 32 at the rear face of the inner compression part 6. The spring 43 bears against the rear face 3 and serves to urge the inner compression part 6 in the direction of the outer compression part 4 under the action of compression means (not depicted).

An additional linkage 46 (see FIG. 6), which serves to maintain a constant distance between two cable bushings 1 located at each of the ends of a protective sleeve 47, is inserted into a lateral orifice 48, that passes through the non-removable central pieces 29, 31 of the outer and inner compression parts 4, 6. In order to avoid rotation, the linkage 46 and its orifice 48 also have a hexagonal cross section. The linkage 46 will be positioned adjacent a longitudinal edge 49 of the shells that form the 15 sleeve 47.

In a second preferred embodiment of the present invention (see FIGS. 7 to 9), the pieces 19, 21, 22, 23, 24, 26, 27 and 28 are pivotally connected to their respective central pieces 29 and 31 and can be readily moved out of position and refitted (see arrow R in FIG. 7) by the operator. The pivotal connection can take any suitable form but is shown in the drawing (with respect to the movable piece 24) as comprising outwardly-extending lugs 51, at one end of the periphery of the movable piece, that clip into apertures 53, 54 in extensions 56, 57 on the respective non-removable central piece 29 and 31. The movable piece 24 can thus be pivoted outwards, from the end opposite to the lugs 51, when the operator desires to gain access to the cable opening 13. As an alternative (not illustrated), the pivotal connection could be provided by a pin passing through the apertures 53, 54 and a corresponding aperture in the end of the periphery of the movable piece 24.

Figure 7:
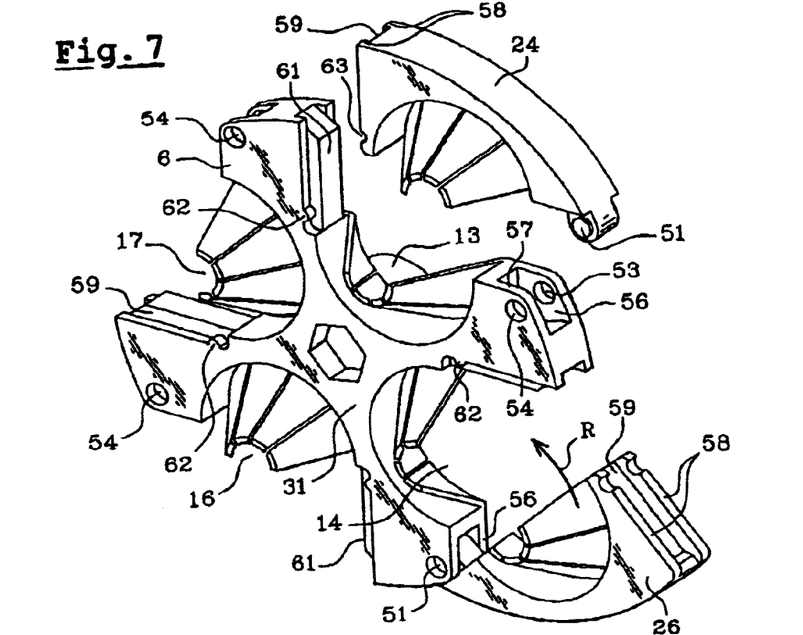
FIG. 7 depicts a partial exploded perspective view of a compression part according to a second preferred embodiment of the present invention.
Figure 8:
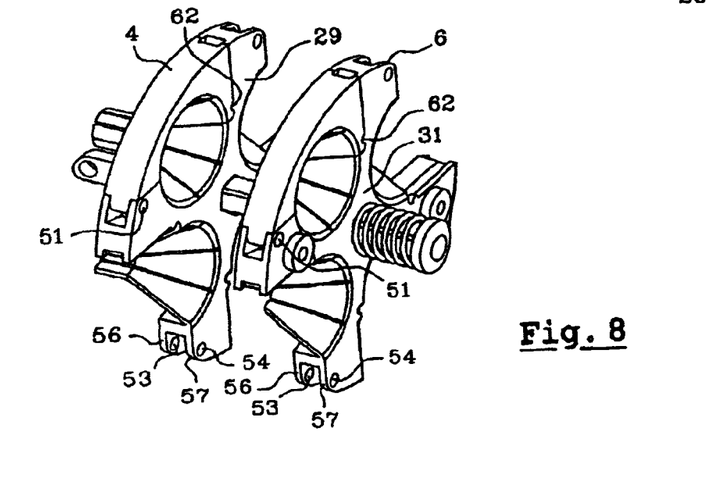
FIG. 8 depicts a partial rear perspective view of a cable bushing with the compression parts according the embodiment of FIG. 7 without the sealing means.
Figure 9:
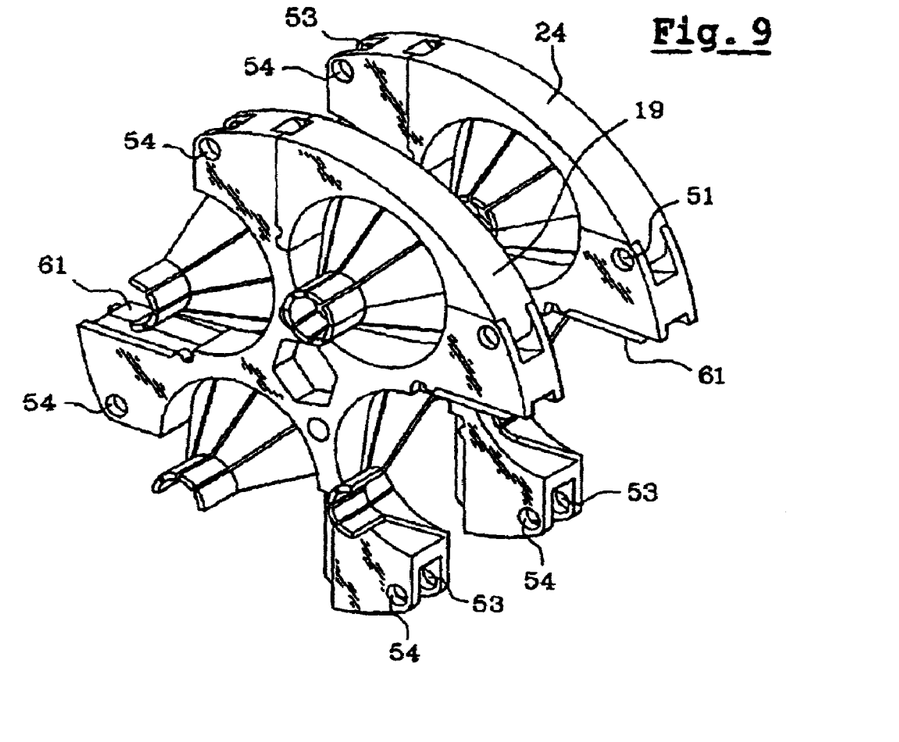
FIG. 9 depicts a partial front perspective view of the cable bushing of FIG. 8.

At the other end of the periphery of the movable piece 24, for ensuring the sealing with the respective non-removable central piece 31, two lugs 58 define a groove 59. The 30 groove 59 engages a rib 61 that extends from the non-removable central piece 31. For maintaining the movable piece 24 in place when the opening 13 is closed, clip-fastening means are provided in the form of a lug 62 deploying from the central piece 31 and extending into a concavity 63 formed in the movable piece 24. The outer end of the rib 61 is inclined, to provide a space into which a tool can be inserted and used as a lever when it is required to pivot the movable piece outwards for access to the cable opening 13.

Figure 10A:
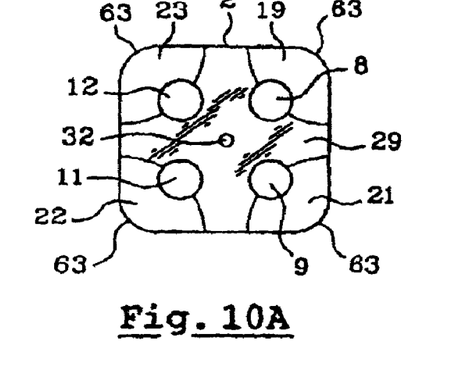
FIGS. 10A and 10B depict respectively third and fourth preferred embodiments of a cable bushing according to the present invention.

According to a third embodiment for the cable bushing of the present invention (see FIG. 10A), the outer shape of the compression part 4, 6 may be different. One suitable design is a cable bushing with roughly rectangular (preferably square) faces 2 and 3 (of which only the face 2 appears in FIG. 10A). The four corners 63 of the rectangle are preferably of a rounded shape. Any number of cable openings maybe provided. In the illustrated embodiment, four cable openings 8, 9, 11 and 12 and four movable or removable pieces 19, 21, 22 and 23 are provided.

Figure 10B:
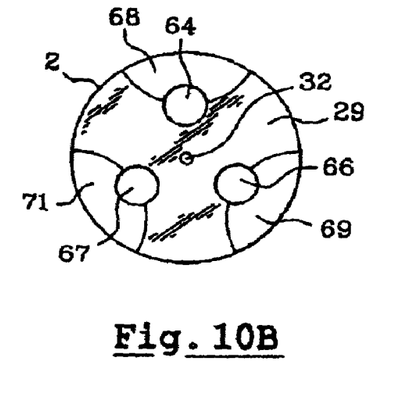

According to a fourth embodiment for the cable bushing of the present invention (see FIG. 10B), the number of cable openings (and hence the maximum number of cables) may vary. In the illustrated embodiment, three cable openings 64, 66 and 67 are provided in the cable bushing, and three movable or removable pieces 68, 69 and 71 are respectively provided for closing those openings 64, 66 and 67.

In the embodiments described above, any suitable sealing material 7 could be used between the pieces of the compression parts 4, 6, provided it can be formed to the appropriate shape and will provide the required degree of sealing around the cables and to the sleeve 47 as well as between the movable or removable pieces. The required degree of sealing will depend on the particular environment in which the cable bushing is to be employed. Gel sealants are known and are particularly suitable because they are soft and are capable of high elongation but can also be molded to the required shapes.

Mode of Operation

In one preferred embodiment, while the cable bushing 1 is being assembled, the two non-removable pieces, outer 29 and inner 31, are slipped onto the rod 32. The spring 43 and the peg 44 are fitted. Gel 38 is then overmolded between the two non-removable parts 29 and 31 belonging respectively to the two compression parts, outer 4 and inner 6. In a preferred embodiment, gel 38 is overmolded on an axle inserted in the mold. The definitive rod 32 is inserted afterwards. The pairs of removable pieces 19, 21, 22, 23, 24, 26, 27 and 28 are separated from the non-removable pieces 29 and 31. Next, gel 33, 34, 36 and 37 is overmolded between all the removable pieces 19, 21, 22, 23, 24, 26, 27 and 28 so as to connect them in pairs.

Next, the operator, when using the cable bushing, will insert one or more cables into the partial openings defined by the non-removable pieces 29 and 31. He will then place all the pairs of removable pieces 19, 21, 22, 23, 24, 26, 27 and 28 including the molded gel over the cables and will thus assemble the openings 8, 9, 11, 12, 13, 14, 16 and 17 (in the direction of arrow A of FIG. 4). A plug (not depicted) may be used to longitudinally close off any openings which have not been used.

The operator will then place the sleeve 47 around the assembled cable bushing 1. He will fix the additional linkage 46 of one sealed cable bushing to the other sealed cable bushing located at the opposite end and will close up the sleeve 47. The operator will then compress the gel 7 by moving the outer compression part 4 in the direction of the inner compression part 6 using known means, for example of the type requiring turning (see arrow C in FIG. 5).

Other means of compression do exist, for example in the form of a wedge slipped into an oblong hole formed in the rod and pulling or pushing-this rod and the compression part, or in the form of a rod displaced by a pivoted lever acting as a cam, displacing the rod axially. The compression of the gel 7 ensures a sealing engagement between the various pieces of the bushing 1. The compression of the gel 7 ensures also a sealing engagement on one hand between the bushing 1 and the cables and on the other hand between the bushing 1 and the outer sleeve 47.

If it is required, at any time subsequently to access a cable within the sleeve 47, the compression force on the compression parts 4, 6 is released so that they can move away from one another and de-compress the gel 7 in the bushings 1. The sleeve 47 is 25 then opened and the appropriate movable piece of the/each bushing is moved out of position on the non-removable piece to provide access to the cable. If access to the other cables inside the sleeve 47 is not required, they can remain undisturbed and, when the operation is completed, the/each bushing can be re-assembled, the sleeve closed and the gel in the bushings re-compressed.

The present invention is not restricted to the embodiments described and illustrated. Numerous modifications may be made without in any way departing from the context defined by the scope of the set of claims.

For example, the shape of the removable pieces 19, 21, 22, 23, 24, 26, 27 and 28 may vary, according to the number of cables. The number of leaves 18 per opening 8, 9, 11, 12, 13, 14, 16 and 17 may vary and may be less than or greater than eight. The opening or openings 8, 9, 11, 12, 13, 14, 16 and 17 may comprise an alternating series of concentric ribs and grooves, which can be broken according to the diameter of the cable inserted. These concentric ribs and grooves may be formed both on the non-removable central pieces and on the movable/removable pieces of the compression parts 4, 6.

As a further modification, the sealing member 7 may be compressed by movement of the inner compression part 6 towards the outer compression part 4.

What is claimed is:

1. A cable bushing intended to close off, in a sealed way, a space around one or more cables within a sleeve having a first side and a second side, said bushing comprising:
    a first compression part intended to be positioned towards the first side of the sleeve;
    a second compression part, offset in a longitudinal direction from the first compression part and intended to be positioned toward the second side of the sleeve;
    at least one opening in said first compression part and at least one corresponding opening in said second compression part, each of said at least one opening in said first compression part together with said at least one corresponding opening in said second compression part, configured for a respective cable to pass through;
    sealing means located between said first compression part and said second compression part; and
    compression means for moving said first compression part and said second compression part towards one another in the longitudinal direction to compress said sealing means;
    wherein said first compression part and said second compression part each comprise a separately movable piece associated with each single respective opening therein, wherein each separately movable piece is movable to provide access individually to said single respective opening.

2. A cable bushing according to claim 1, wherein said first compression part comprises a plurality of said openings; wherein said second compression part comprises a plurality of said corresponding openings; and wherein said first and second compression part each comprise a plurality of said individually moveable pieces to provide access to said respective openings.

3. A cable bushing according to claim 2, wherein each of said individually movable pieces of said first compression part lies longitudinally facing a respective individually movable piece of said second compression part.

4. A cable bushing according to claim 3, wherein said sealing means comprises, between said individually movable pieces of said first compression part and said longitudinally-facing individually movable pieces of said second compression part, respective movable portions.

5. A cable bushing according to claim 2, wherein said first and second compression parts have a circular shape when viewed in said longitudinal direction.

6. A cable bushing according to claim 5, wherein each of said individually movable pieces is in the form of a sector of a circle with a truncated point.

7. A cable bushing according to claim 2, wherein said first and second compression parts have a rectangular shape when viewed in the said longitudinal direction.

8. A cable bushing according to claim 2, wherein each of said individually movable pieces is secured in said respective compression part by clip-fastening means in the form of lugs and concavities.

9. A cable bushing according to claim 2, wherein each of said individually movable pieces is pivotally mounted in said respective compression part.

10. A cable bushing according to claim 2, wherein said openings are circular and comprise inwardly directed leaves for gripping cables that pass through said openings.

11. A cable bushing according to claim 2, further comprising at least one longitudinal rod connecting said first compression part to said second compression part.

12. A cable bushing according to claim 11, wherein said longitudinal rod has an angular cross section and is inserted in corresponding angular orifices said first and second compression parts.

13. A cable bushing according to claim 1, wherein said sealing means is compressed by movement of said first compression part in said longitudinal direction towards said second compression part.

14. A cable bushing according to claim 1, wherein said sealing means comprises a gel.

15. A cable bushing according to claim 2, wherein each of said compression parts comprises four of said openings and four of said movable pieces.

16. A protective sleeve for a cable splice, in combination with a cable bushing according to claim 1, wherein said bushing is mounted in said sleeve.

17. A sleeve according to claim 16, in combination with a second cable bushing according to claim 1 and a linkage passing both through said first and second compression parts of each of said bushings and serving to maintain the distance between said cable bushings.

18. A cable bushing intended to close off, in a sealed way, a space around a plurality of cables within a sleeve having a first side and a second side, said bushing comprising:
   a first compression part intended to be positioned towards the first side of the sleeve;
   a second compression part, offset in a longitudinal direction from the first compression part and intended to be positioned toward the second side of the sleeve;
   a plurality of openings in said first compression part and a plurality of corresponding openings in said second compression part, each of said openings in said first compression part being intended, together with said corresponding openings in said second compression part, for a respective cable to pass through;
   a portion of gel between said first compression part and said second compression part; and
   compression means for compressing said first compression part and said second compression part towards one another in the longitudinal direction to compress said gel;
   wherein said first compression part and said second compression part each comprise a separately moveable piece associated with each single respective opening therein, wherein each separately moveable piece is movable to provide access individually to said single respective openings.

19. A cable bushing according to claim 18, wherein each of said individually movable pieces of said first compression part lies longitudinally facing a respective individually movable piece of said second compression part.

20. A cable bushing according to claim 18, wherein said portion of gel comprises, between said individually movable pieces of said first compression part and said longitudinally-facing individually movable pieces of said second compression part, a plurality of respective movable portions of said gel.

21. A cable bushing according claim 18, wherein said first and second compression parts have a circular shape when viewed in said longitudinal direction.

22. A protective sleeve for a cable splice, in combination with a cable bushing according to claim 18, wherein said bushing is mounted in said sleeve.

* * * * *